US006267067B1

(12) United States Patent
Mayerle et al.

(10) Patent No.: US 6,267,067 B1
(45) Date of Patent: Jul. 31, 2001

(54) NURSE RECEIVER AND HEADER FOR AIR SEEDERS

(75) Inventors: Dean J. Mayerle; David R. Hundeby; Ronald N. Engen, all of Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/433,874

(22) Filed: Nov. 4, 1999

Related U.S. Application Data

(60) Provisional application No. 60/107,154, filed on Nov. 5, 1998.

(51) Int. Cl.[7] ........................................ A01C 7/20

(52) U.S. Cl. ........................................ 111/170; 111/174

(58) Field of Search ........................................ 111/174, 175, 111/176, 185, 170

(56) References Cited

U.S. PATENT DOCUMENTS 3,490,654 * 1/1970 Fischer ............................ 111/174 X
3,964,639 * 6/1976 Norris et al. ..................... 111/176 X
4,060,121 * 11/1977 Grataloup ............................ 222/193
4,393,791 * 7/1983 Suderman ........................ 111/176 X
4,493,273 * 1/1985 Gauchet et al. ................. 111/176 X
5,156,102 * 10/1992 Andersen ............................ 111/175
5,161,473 * 11/1992 Landphair et al. .............. 111/174 X
5,392,722 * 2/1995 Snipe et al. ......................... 111/174
5,915,312 * 6/1999 Meyer et al. ........................ 111/174

* cited by examiner

*Primary Examiner*—Christopher J. Novosad
(74) *Attorney, Agent, or Firm*—Larry W. Miller; J. William Stader

(57) ABSTRACT

A nurse receiver header for an agricultural planting implement is cooperable with a nurse mechanism that conveys a stream of seeds entrained in an air stream from a central hopper. A receiver is positioned at the planting mechanism to receive the seeds entrained in the air stream and accumulate a supply of the seeds for utilization by the associated planting mechanism. The receiver header may include a vent for dissipating the air stream when receiving the seeds for distribution to the receiver. The vent is provided with a hood to keep contaminants from entering the vent and passing into the planting mechanism. The receiver header is positioned so that an appropriate supply of seeds for the planting mechanism fills the tube between the receiver header and the receiver including the vent, resulting in a decreased volume of discharged air for the air stream and a diminished ability for the nurse mechanism to convey seeds. The receiver header can be configured to service multiple receivers. The receiver header is mounted at an angle inclined to the vertical when in an operating position such that the receiver header can be rotated through an angle in the range of 70–110 degrees to a transport position without inverting the receiver header, thereby retaining the seeds accumulated in the receiver.

37 Claims, 16 Drawing Sheets

Fig. 18a
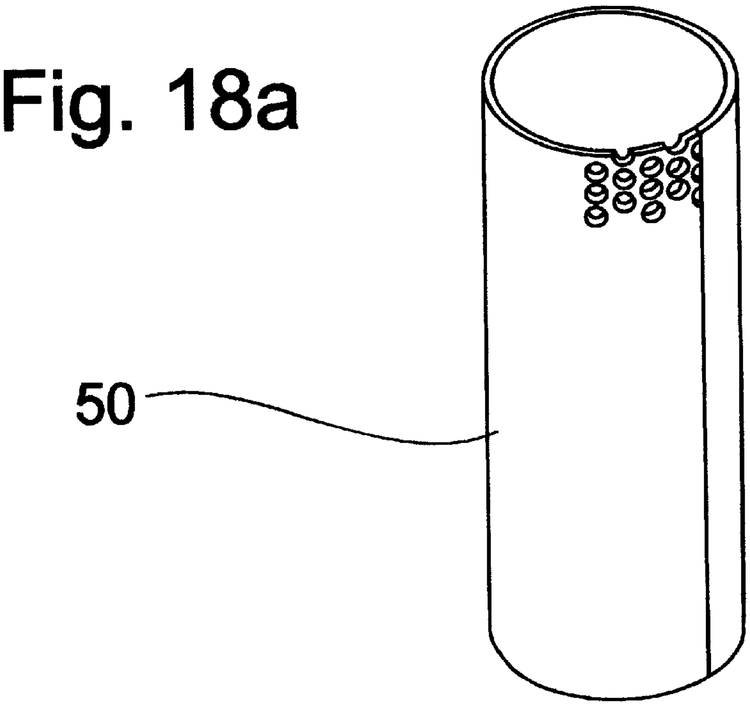
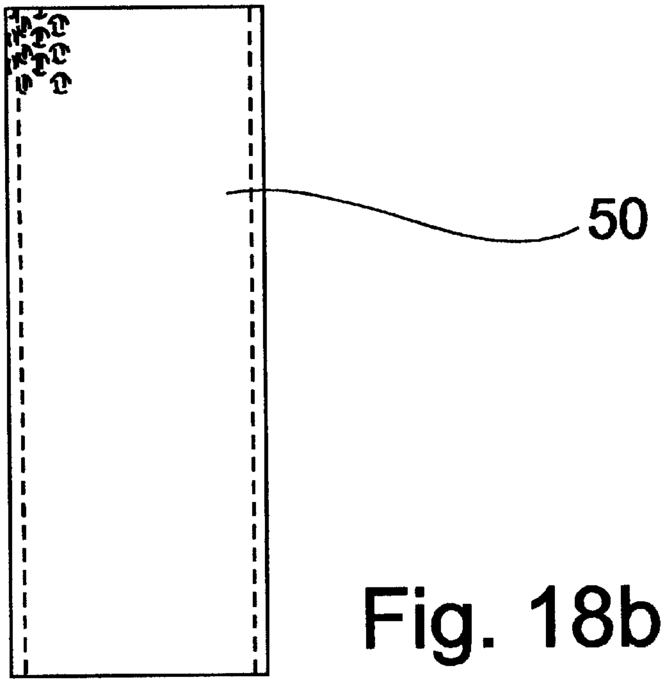
Fig. 18b

NURSE RECEIVER AND HEADER FOR AIR SEEDERS

This application now claims benefit of Provisional application Ser. No. 60/107,154 filed Nov. 5, 1998,

BACKGROUND OF THE INVENTION

This invention relates generally to air seeders for planting seeds in the ground in an agricultural environment and, more specifically, to a nurse system cooperable with a planter mechanism to feed seed or other particulate material to a planting mechanism for insertion of that material into the ground.

As the size of agricultural implements continues to grow, the versatility of such implements becomes more significant. Large air seeders have become increasingly popular for the planting of seeds, fertilizer and other product without strict regard for the exact placement of the seeds particles. For crop planting operations that require seed singulation, nurse systems are used to feed seed or other particles from larger hoppers into smaller reservoirs located at the singulators. A nurse system enables an air cart typically used for dryland farming, (cereal crops, etc.), to be adapted for use in row crop planting applications, such as, for example, corn and soybean. A nurse inductor system can be used to enable a farmer to singulate on-row, with one central hopper filling location, and to plant more acres before having to stop to fill the central hopper again, resulting in quicker planting and less labor, while maintaining the precision spacing available by on-row singulation.

In U.S. Pat. No. 5,161,473, a nurse system is disclosed which works off a specialized cart. The air comes into the seed delivery area coaxial with the seed tube that takes the air and seed to the row units. With this system substantial energy is used to nurse the seed since the air changes direction abruptly. This particular nurse system provides a dedicated fan to feed the 12 rows to be planted from the nurse system. This system requires the adding or removing of shims to obtain adjustment for different seeds, which is difficult and inconvenient to accomplish. U.S. Pat. No. 5,156,102 and U.S. Pat. No. 4,060,181 teach other nurse embodiments.

SUMMARY OF THE INVENTION

It is an object of this invention to provide a nurse receiver header cooperable with a nurse induction system for use with planters requiring singulation of the seeds for planting in the ground.

It is a feature of this invention that the nurse induction system enables the use of an existing air cart for nursing seeds to individual planter units in a passive manner.

It is another feature of this invention that a small amount of seed is held in a receiver at the planter.

It is an advantage of this invention that the small amount of seed retained at the planter facilitates the clean-up of the planter.

It is another object of this invention to enable a singulating planting mechanism to be used in conjunction with an air cart.

It is another advantage of this invention that the nursing system would not require the addition of active controls for the nurse induction mechanism, the system being self-regulating without any external electronic control systems being necessary.

It is another feature of this invention that a vent is provided to dissipate the air stream delivering seed particles from the air cart so that the seed particles can drop by gravity into the receiver for the planting mechanism.

It is still another advantage of this invention that the vent can be formed as part of the receiver structure or the structure of the receiver header.

It is still another advantage of this invention that the induction of seed or other particulate product is accomplished more evenly and consistently, thereby reducing the possibility of plugging of the lines.

It is yet another advantage of this invention that the air usage required by the nurse induction system is reduced, so that the existing fan on the air cart can be used for both nursing and the application of particles from the other air cart hopper.

It is still another feature of this invention that the wings of the planter unit can be folded without the need to empty particles out of the planter hopper first.

It is yet another advantage of this invention that the planter can be folded with the wings pivoted closer to the first row unit on the wing section of the planter row unit without interference between the planter seed reservoirs.

It is still another advantage of this invention that more than one planter singulator can be fed with one nurse inductor line, thus enabling the development of a wider planter toolbar with substantially more planter units than previously available.

It is a further advantage of this invention that the nurse inductor mechanism can be used on an air cart used in dryland farming.

It is yet another feature of this invention to provide a hood for the vent to keep rain and contaminants from entering the vent.

It is still a further advantage of this invention that the small supply of seed at the receiver is kept clean.

It is still a further object of this invention to provide nurse receiver header for an agricultural planting implement which is durable in construction, inexpensive of manufacture, carefree of maintenance, facile in assemblage, and simple and effective in use.

These and other objects, features and advantages can be accomplished according to the instant invention by a nurse receiver header for an agricultural planting implement is cooperable with a nurse inductor mechanism that conveys a stream of seeds entrained in an air stream from a central hopper. A receiver is positioned at the planting mechanism to receive the seeds entrained in the air stream and accumulate a supply of the seeds for utilization by the associated planting mechanism. Either the receiver header or the receiver structure includes a vent for dissipating the air stream when receiving the seeds for distribution to the receiver. The vent is provided with a sheltering device to keep contaminants from entering the vent and passing into the planting mechanism. The receiver header is positioned so that an appropriate supply of seeds for the planting mechanism fills the tube between the receiver header and the receiver, resulting in a decreased velocity for the air stream and a diminished ability for the nurse inductor mechanism to convey seeds. The receiver header can be configured to service multiple receivers. The receiver header is mounted at an angle inclined to the vertical when in an operating position such that the receiver header can be rotated through an angle in the range of 70 to 110 degrees to a transport position without inverting the receiver header, thereby retaining the seeds accumulated in the receiver.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a perspective view of the particle hopper side of the nurse induction unit, with the exterior induction box wall removed, the nurse distribution lines being oriented in vertical pairs to leave open space between the lines for the particles to pass through;

FIGS. 18*a–d* are perspective, side and front elevational, and top plan views of the nurse system receiver header assembly vent.

DETAILED DESCRIPTION OF THE PREFERRED EMBODIMENT

Figure 1:
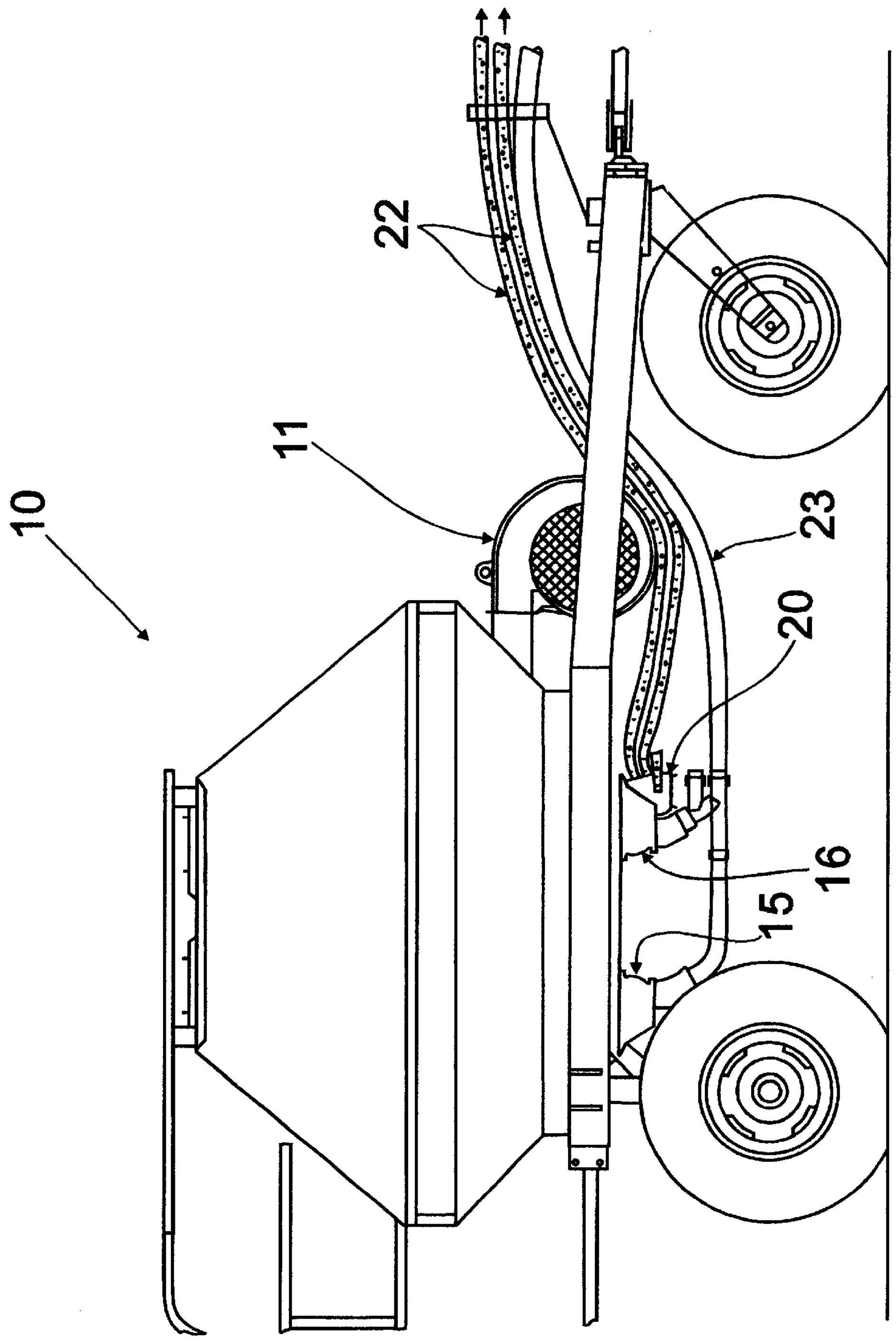
FIG. 1 is a side elevational view of a typical air seeder mechanism on which a nurse induction mechanism incorporating the principles of the instant invention is mounted.

Referring first to FIGS. 1–4, the principles of the nurse induction apparatus can best be seen. The nurse induction adapter is mounted on a conventional air seeder, air cart, and redirects the air stream 13 coming from the fan 11 in an air cart box 16 into a path that leads through the nurse inductor 20. The air stream is guided into a nozzle region 30 that directs the air along a flow path that tangentially engages a pile of seed particles S exiting the opening 19 at the bottom of the seed hopper 12. The turbulence of the blast of air from the nozzle 30 loosens the seed particles from this assemblage of seed particles S exiting the opening 19 in the bottom of the seed hopper 12, entraining the individual seed particles into the air stream as it follows a path to the distribution lines 22 above the seed particle pile. The individual seed particles remain suspended in the air stream where the air bleeds off and the individual seed particles fall by gravity into a second pile or mass at the planting mechanism.

As best seen in FIGS. 3–7, the air stream 13 through the nurse inductor apparatus 20 is split at the general location of the seed particle mass at the bottom of the central seed hopper 12 on the air cart 10 into individual sections 31 that are isolated by generally vertical walls 32. Each individual section 31 leads to a different seed distribution tube 22 and, ultimately, to a different receiver header 45 and associated receivers 40. The nurse inductor 20 induces seed particles into the air stream when and where there is demand for the particles. The demand for particles is controlled by the level of product in each respective receiver on the output end of the seed distribution tube. When the receiver 40 is full, air is restricted from escaping from the seed distribution tube by the massed seed particles within the seed distribution tube. As a result of the filled receiver 40, which prevents the passage of air there through, the air flow and air velocity reduce due to increased pressurization of the line. This resultant reduction in potential air pressure reduces the capacity of the flow of air to induce the seed particles into the corresponding seed distribution tube 22. Since the flow of air through the nurse inductor 20 is spread across the entire unit, the flow of air will tend to go to the lines that have open receivers because of the less airflow resistance.

The divider walls 32, that separate the air and entrained seed particle flows to each respective seed distribution tube 22, are sealed such that air cannot get into the seed distribution tubes 22 downstream of the pickup area. The sealed vertical walls 32 also prevent cross over of air and entrained seed to different seed distribution tubes 22. This division of airflow enhances operation since each line is operable to run at different times, depending on demand as represented by the massed seed particles in the output end of the seed distribution tubes 22.

The shape of the air and entrained seed particle flow path has an impact on the performance of the inductor. When the receiver 40 is filled to allow only a small volume of air to flow through the receiver, air alone is still capable of traveling through the lines, through the massed seed particles and past the seed particles at the vent. If seed particles were to be allowed to be induced into the lines with airflows that are less than carrying velocity, a blocking of the seed distribution tubes 22 can occur. This problem of blocking the seed distribution tube 22 can be avoided by forming the portion of the inductor structure, just above the area adjacent to the bottom of the central seed hopper where the individual seed particles are entrained into the airflow, larger so that the air velocity slows down in this region.

With the slowed air velocity, any seed particles that had been entrained into the slow flowing air stream fall out of the airflow and are dropped back into the seed particle mass region. Thus, the seed particles are picked up and carried by the air stream only when the air velocity is above the minimum carry velocity, thereby allowing air to be flowing slowly without transporting any entrained seed particles into the full seed distribution tube. Correspondingly, the cross-sectional area of the seed distribution tubes is smaller than the cross-sectional area between the generally vertical walls dividing the plenum into discreet channels. As a result, the air velocity increases once entering the seed distribution tube, allowing the seed particle to be retained within the air stream once it enters the seed tube.

The regulator 25 for the flow of seed particles into the area for entrainment within the air stream is defined by a movable gate 29 forming a common edge along which seed particles flow into the particle pick-up area. The product regulator 25 extends across the entire nurse induction apparatus 20. As the seed particles flow under the product regulator, the seed particles form a pile falling naturally at the angle of repose of the seed particles. The angled surface of the pile of seed particles forms the bottom wall of the air channel in the pick-up area. The proximity of the air nozzle 30 to the wall of product affects the amount of product carried in the air stream. As the regulator 25 is rotated and more or less product is permitted to pass through the opening 19*a* at the bottom of the central seed hopper 12, the seed particles fall either closer to or farther from the air nozzle 30. Since different products, such as different seed types, have properties that affect how easily the air stream picks them up, as well as the differences in the angle of repose at which the products slump, the ideal distance between the product surface and the air nozzle varies with the product being distributed. The product regulator 25 is adjustable to enable the optimum distance to be set for each product type, as well as the desired flow rate.

As the air stream 13 strips the product away close to the bottom of the product regulator 25, product from the hopper 12 replenishes the created cavity. The closer to the bottom of the regulator 25 the product is stripped away, the more quickly the product is replenished. Thus, when the regulator 25 is positioned correctly for the specific type of product being nursed, the induction of product into the air stream is relatively steady. During testing, it was found that steady induction of product into the air stream reduced plugging problems within the distribution tubes 22 while maximizing product delivery efficiency.

The product regulator 25 is located on the hopper side of the induction box so that it does not interfere with the seal of the divider walls 32. The product regulator 25 is formed as a single crescent shaped plate 29 that extends across the entire width of the induction unit 20. The regulator plate 19 is attached to a shaft that is rotated by an external handle 28. Thus, the flow of product across the induction box is controlled with the adjustment of a single handle 28. As a result, the flow rate of seed particles can be controlled for all of the tubes 22 simultaneously, and can be completely shut-off to permit clean-out during which process the air will still be guided through the distribution tubes 22 without carrying seed particles. The rotatable regulator plate 19 can be adapted easily for remote control by appropriate actuators connected to the regulator 25. Such a configuration is particularly advantageous in precision farming practices, as the flow of seed particles through the seed distribution tubes 22 can be turned on and off easily. Alternatively, the regulator 25 could be configured to control the flow of air through the nozzle 30 instead of the flow of seeds.

Figure 5:
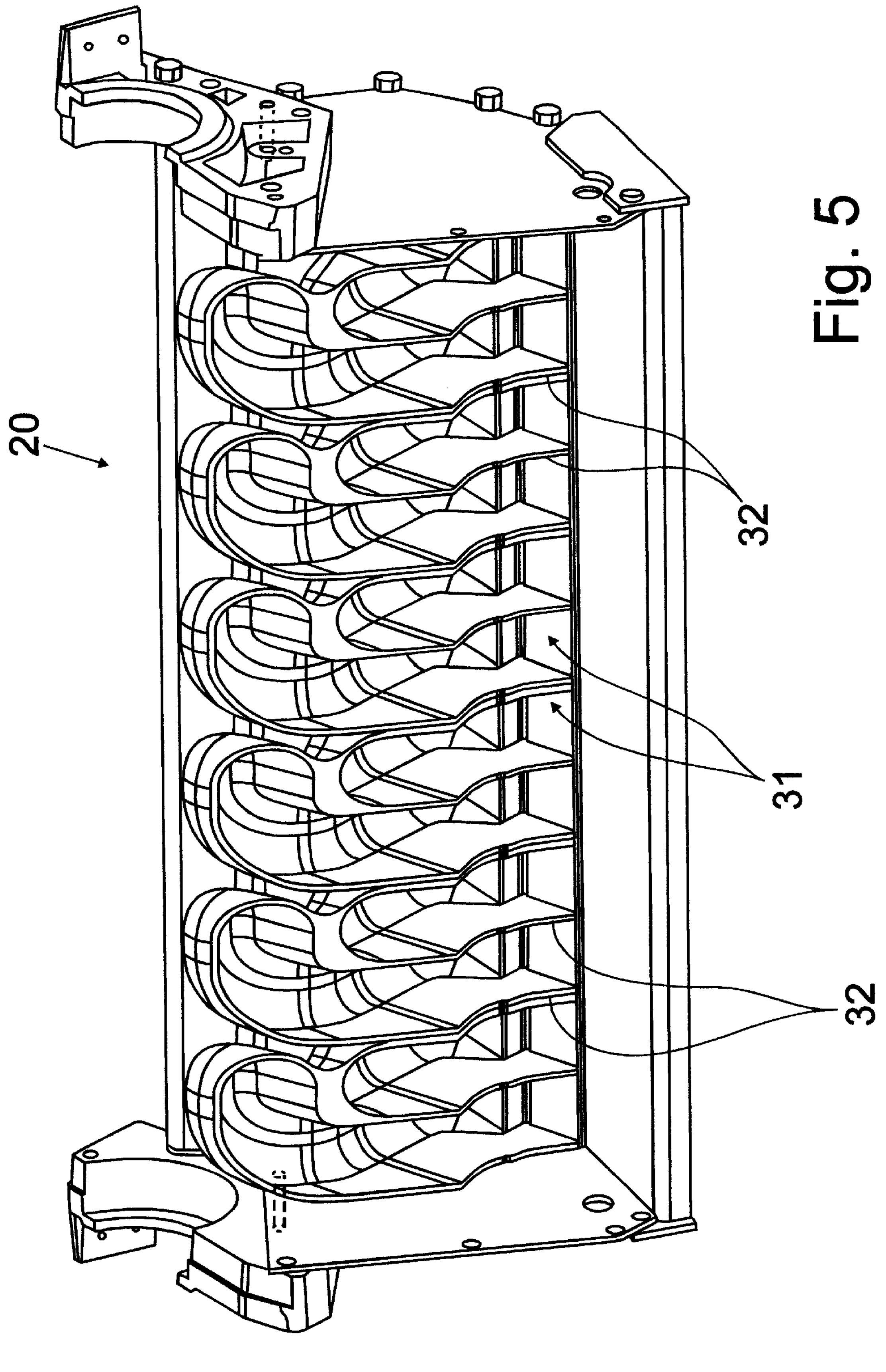
FIG. 5 is a perspective view of the divider wall portion of the nurse induction apparatus to depict the divider walls separating the uppermost and lowermost seed distribution tubes.
Figure 6:
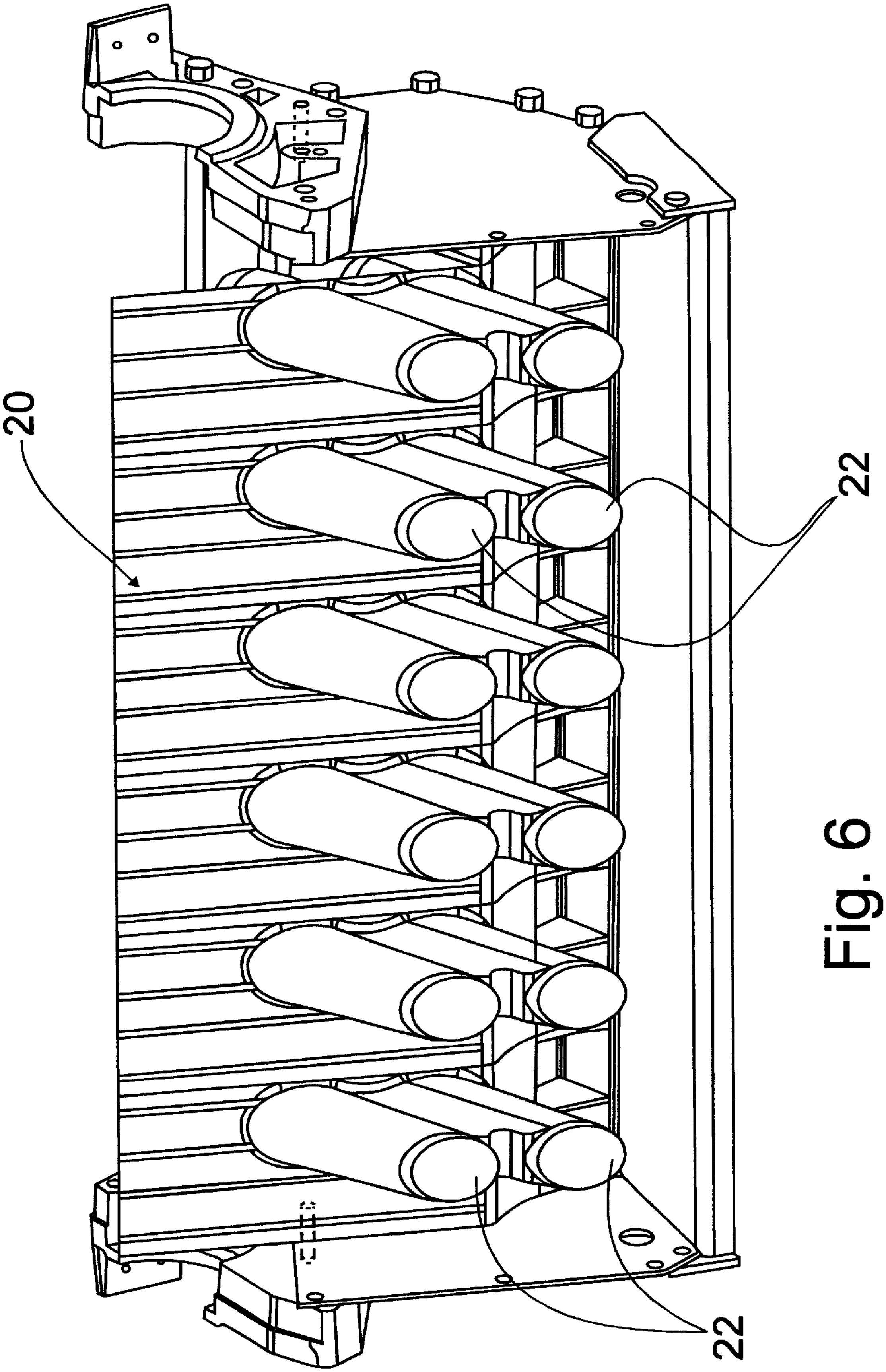
Figure 7:
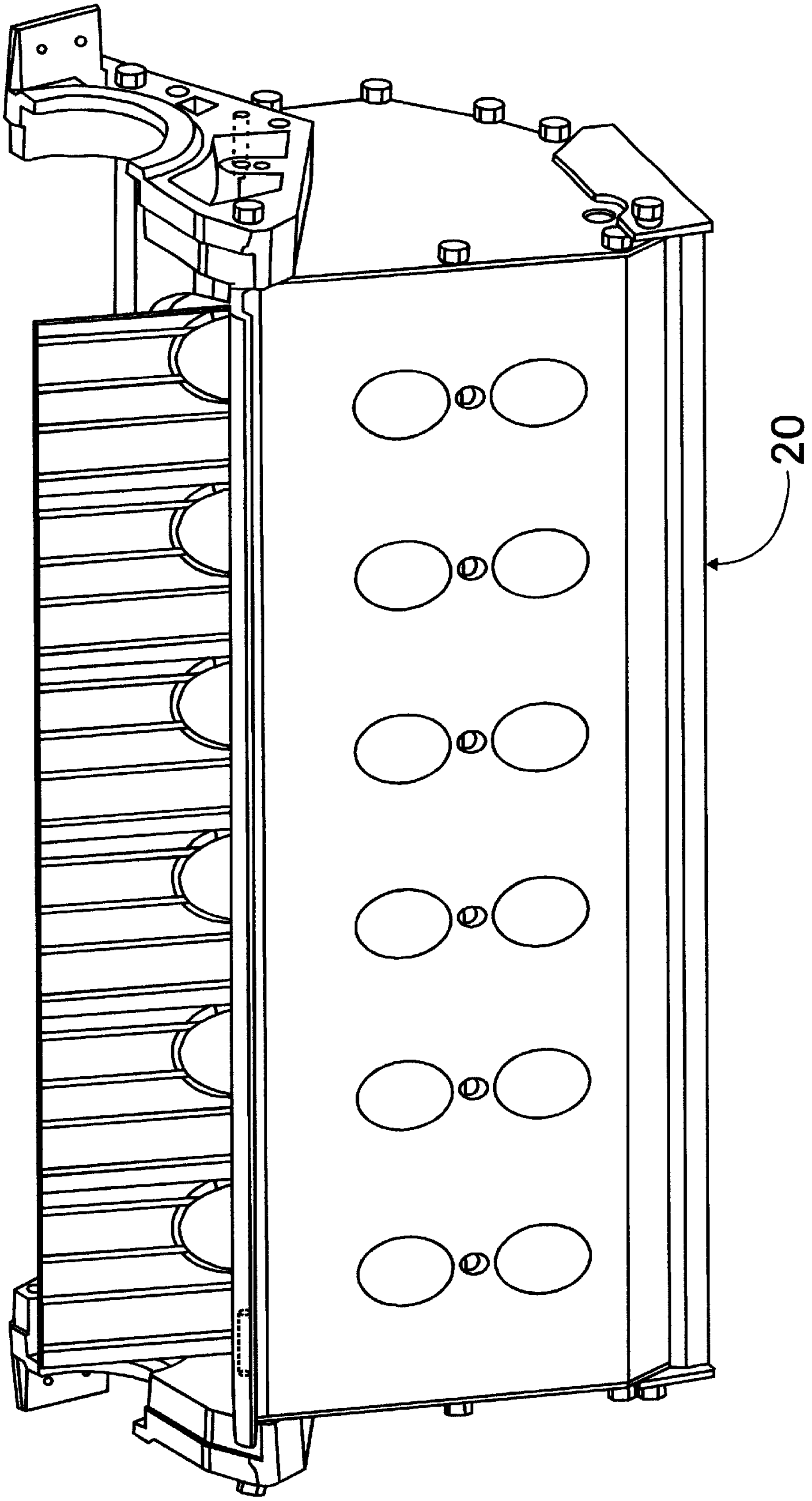
FIG. 7 is a perspective view of the outlet side of the nurse induction unit seen from the exterior of the apparatus.

The generally vertical divider walls 32 are constructed such that the nurse inductor apparatus is made in pair segments that are stacked to fit the width of the induction box. The vertical nature of this modular design allows the inductor apparatus to be compact. The modularity of such a design allows the nurse inductor to be easily adapted to different widths and numbers of product lines, including a compact induction box width having a large number of product lines. To allow more space on the particle hopper side of the inductor unit, the distribution tubes 22 forming the outlet pipes are stacked in vertical pairs. The additional space between outlet pipes reduces bridging of the particles as they flow past the pipes and into the region of the product regulator 25. Each distribution tube 22 is independent. The walls 32 dividing the distribution tubes are curved to direct the air and entrained seed particle stream as shown in FIG. 5. The air and entrained seed make relatively small directional changes in the inductor apparatus, which improves the efficiency of the air system. This efficiency enables both the nursing of more than 12 rows and the use of the second air cart tank for simultaneous fertilizer operations.

Figure 2:
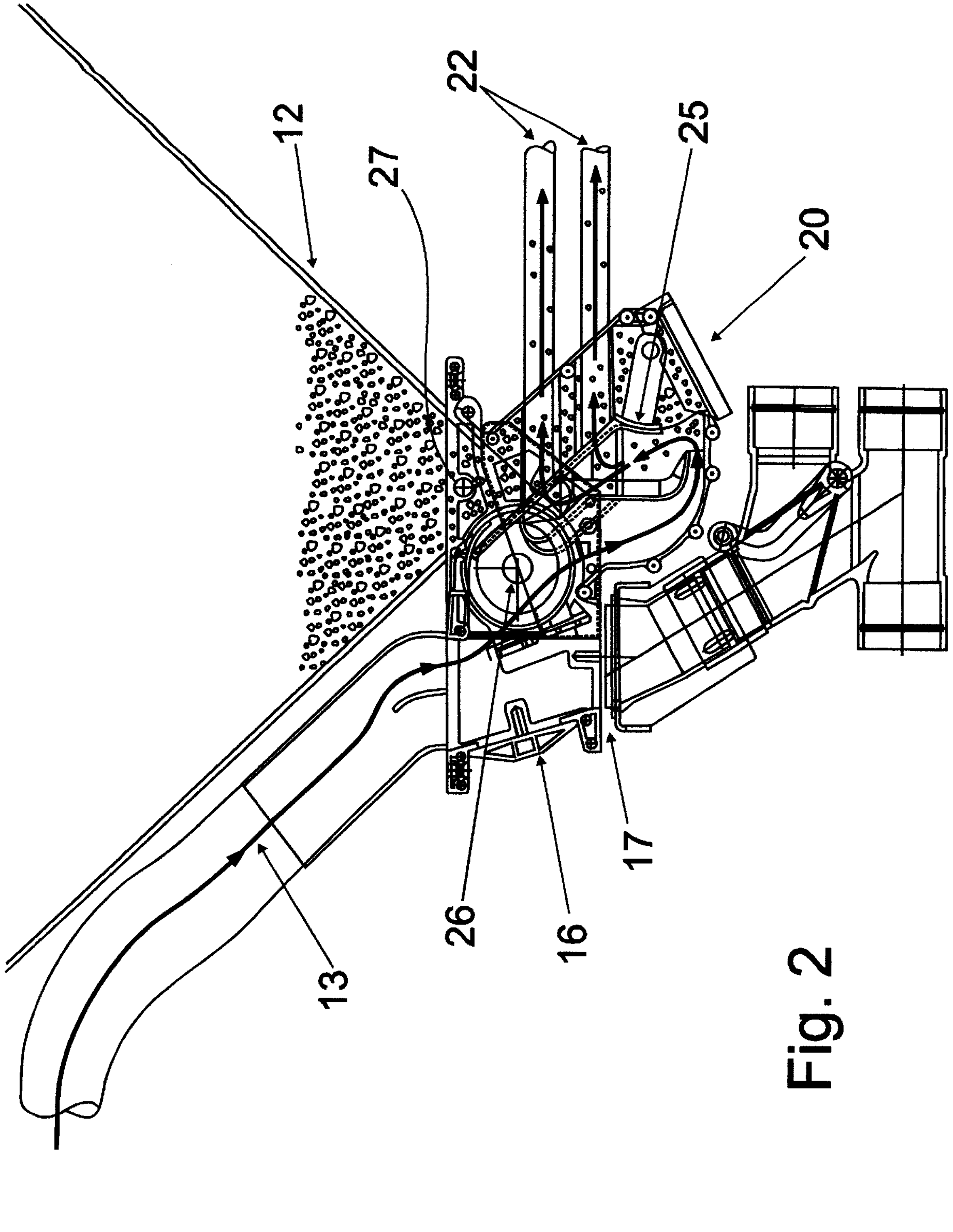
FIG. 2 is a schematic cross-sectional view of the nurse induction system depicted in FIG. 1, the arrows depicting the direction of air flow through the mechanism.
Figure 3:
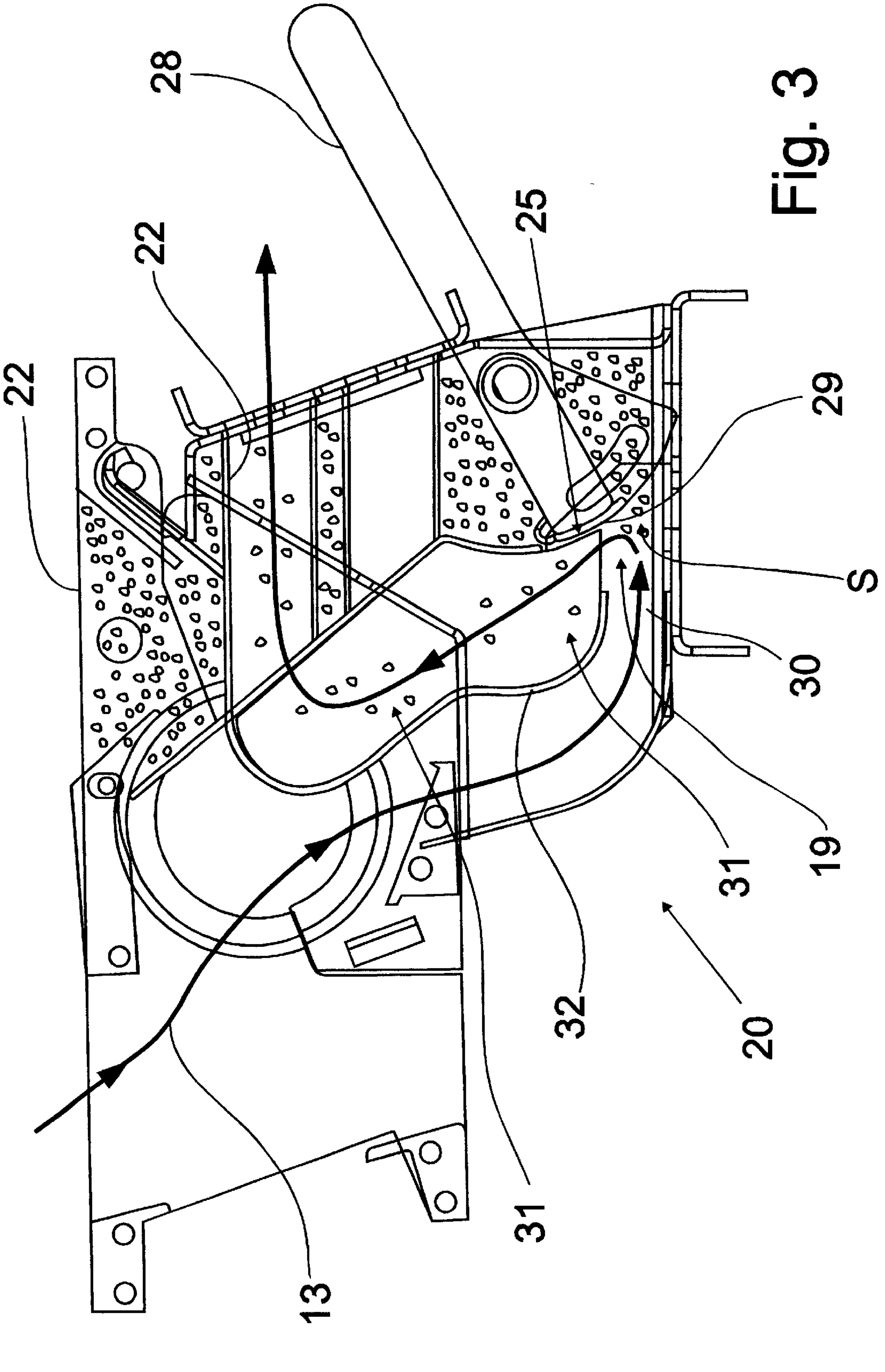
FIG. 3 is an enlarged schematic cross-sectional view of the nurse induction mechanism shown in FIG. 2 to depict the flow of air and seed through the uppermost seed distribution tubes leading to the planting mechanism, the arrows depicting the direction of air flow through the mechanism.
Figure 4:
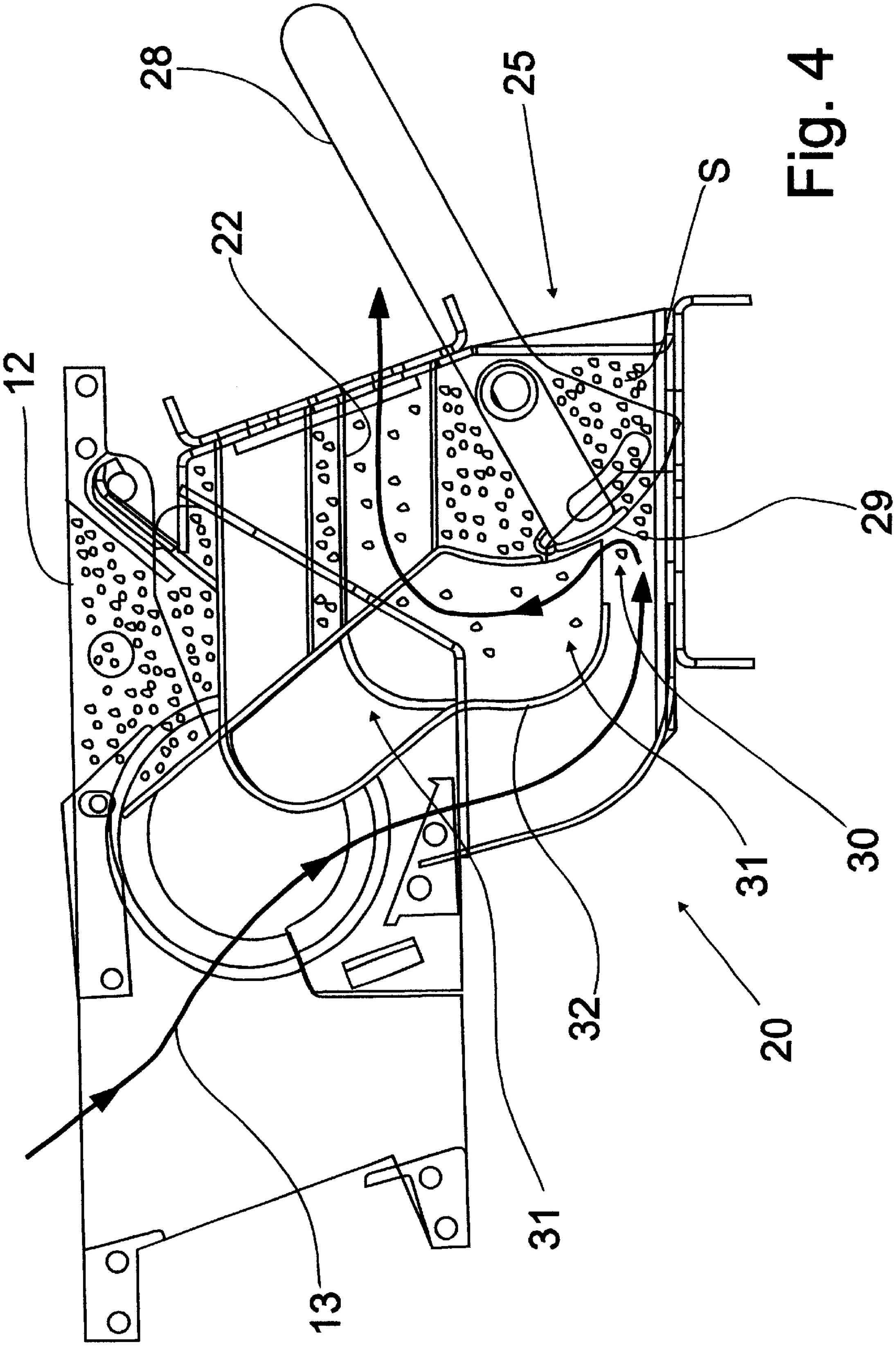
FIG. 4 is an enlarged schematic cross-sectional view similar to that of FIG. 3 except depicting the flow of air and seed through the lowermost seed distribution tubes to the corresponding planting mechanism, the arrows depicting the direction of air flow through the mechanism.

Alternatively, the nurse induction unit 20 is adaptable for use with a stand-alone tank, as well as for with an air cart. Furthermore, the nurse induction unit 20 can also be adaptable to other planter units. As best seen in FIGS. 1 and 2, the nurse induction apparatus is preferably formed as a modular unit that can be inserted into a standard air cart structure to convert the air cart from a straight meter box into a nurse induction box. The conventional air delivery tubes 17 are sealed and remain on the air cart 10, while the nurse induction unit 20 is interposed to receive the air stream 13 from the fan 11. A connection mechanism 16 facilitates the convenient connection of the nurse unit 20 to the air cart 10 as a modular component.

One skilled in the art will recognize that the instant invention is not limited to the conveyance of seed particles, as other particulate matter is commonly distributed through an air cart system, such as fertilizer. Furthermore, the typical air cart 10 is provided with multiple hoppers or tanks containing different product to be planted in the ground. One tank could have seed stored therein, while another tank would have fertilizer and yet another tank could have herbicides or still another reservoir of fertilizer. In such multi-tank configurations, one of the tanks could be provided with a nurse induction unit 20 to convey seeds to the planting devices, while a conventional meter box is used to control the flow of fertilizer or other product to the planting devices by separate distribution tubes. Such a conventional meter box could apply the fertilizer or other product at a variable rate and could be controlled by an electronic controller, as is known for precision farming techniques. Other alternative configurations can include one tank nursing seed to all the singulators, as well as multiple tanks nursing seeds to any one particular singulator.

Referring now to FIGS. 8–18*d*, the nurse system receiver 40 and receiver header 45 can best be seen. The receiver 40 and receiver header 45 are used in conjunction with the nurse inductor system 20, such as the one described above. One skilled in the art will recognize that the header 45 is needed in configurations where the flow is to be split between multiple receivers. The nurse inductor 20 sends an air and entrained particle stream to the receiver 40 when the receiver has less than a desired level of product particles in it. The receiver header 45 is designed to allow air from the air and entrained product particle stream to escape when the particle level is below the air vent, but to limit the amount of air to escape when the particle level is above the air vent 50.

Figure 11:
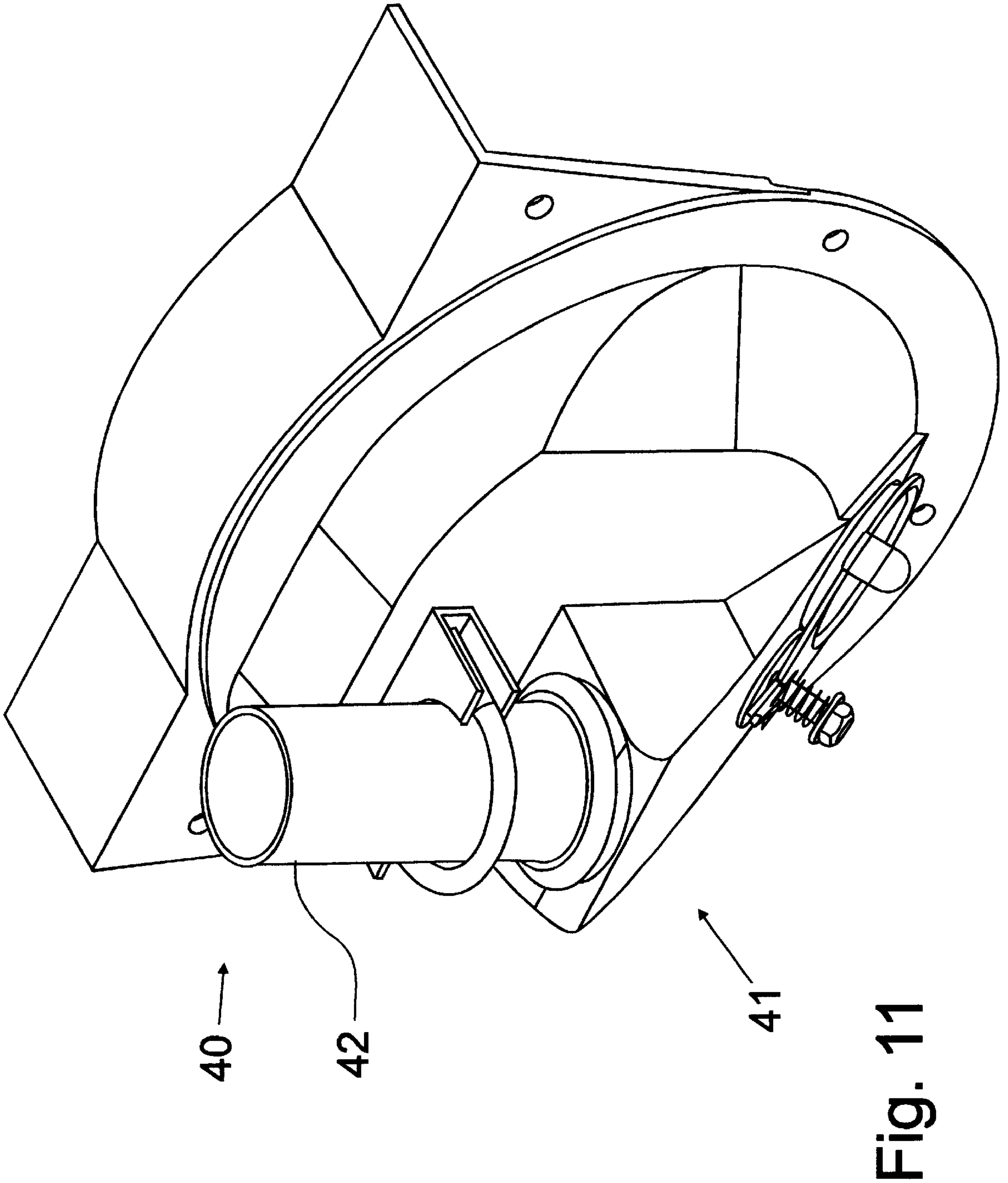
FIG. 11 is an enlarged perspective view of the nurse system receiver assembly.
Figure 12:
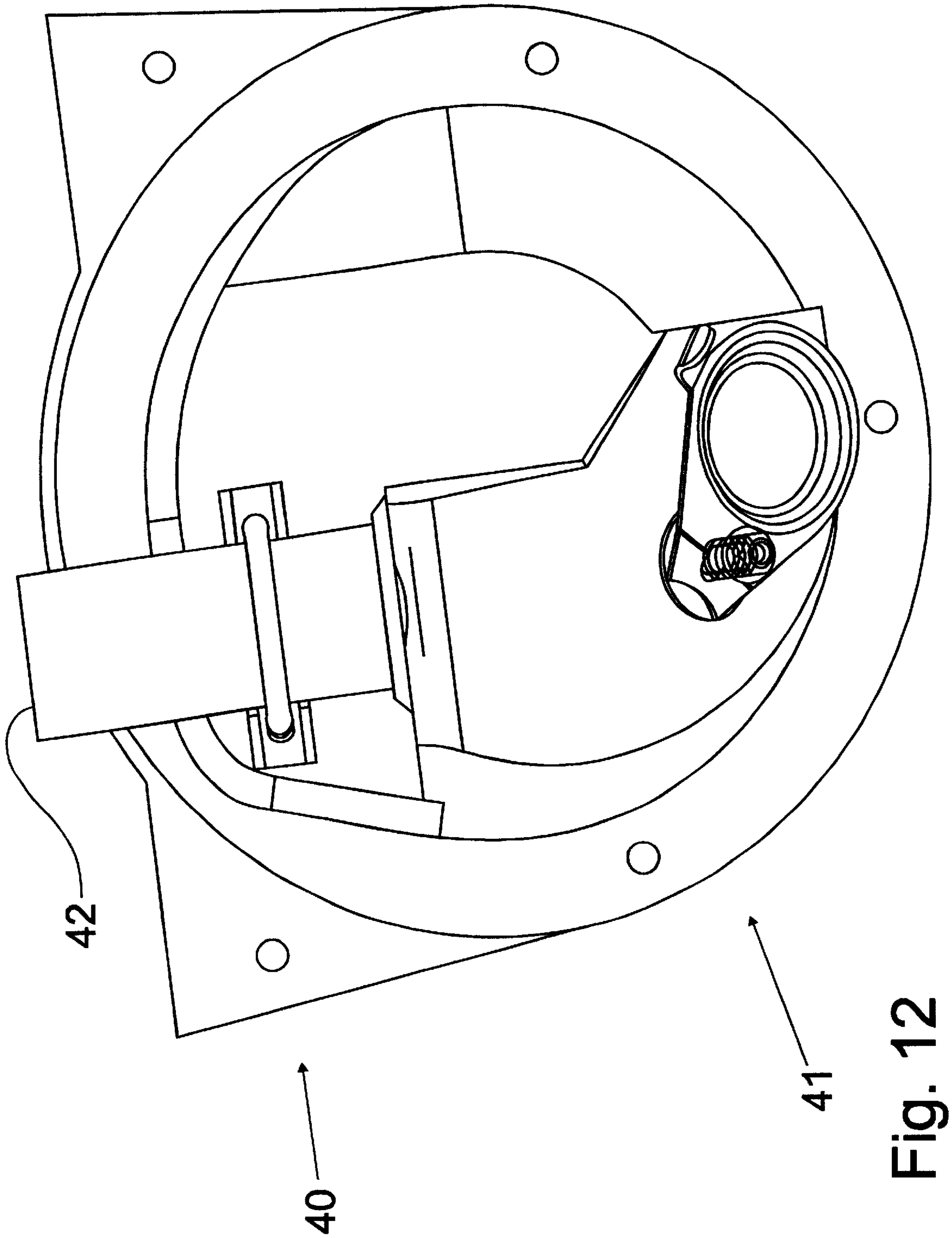
FIG. 12 is an enlarged front elevational view of the nurse system receiver assembly shown in FIG. 11.
Figure 13:
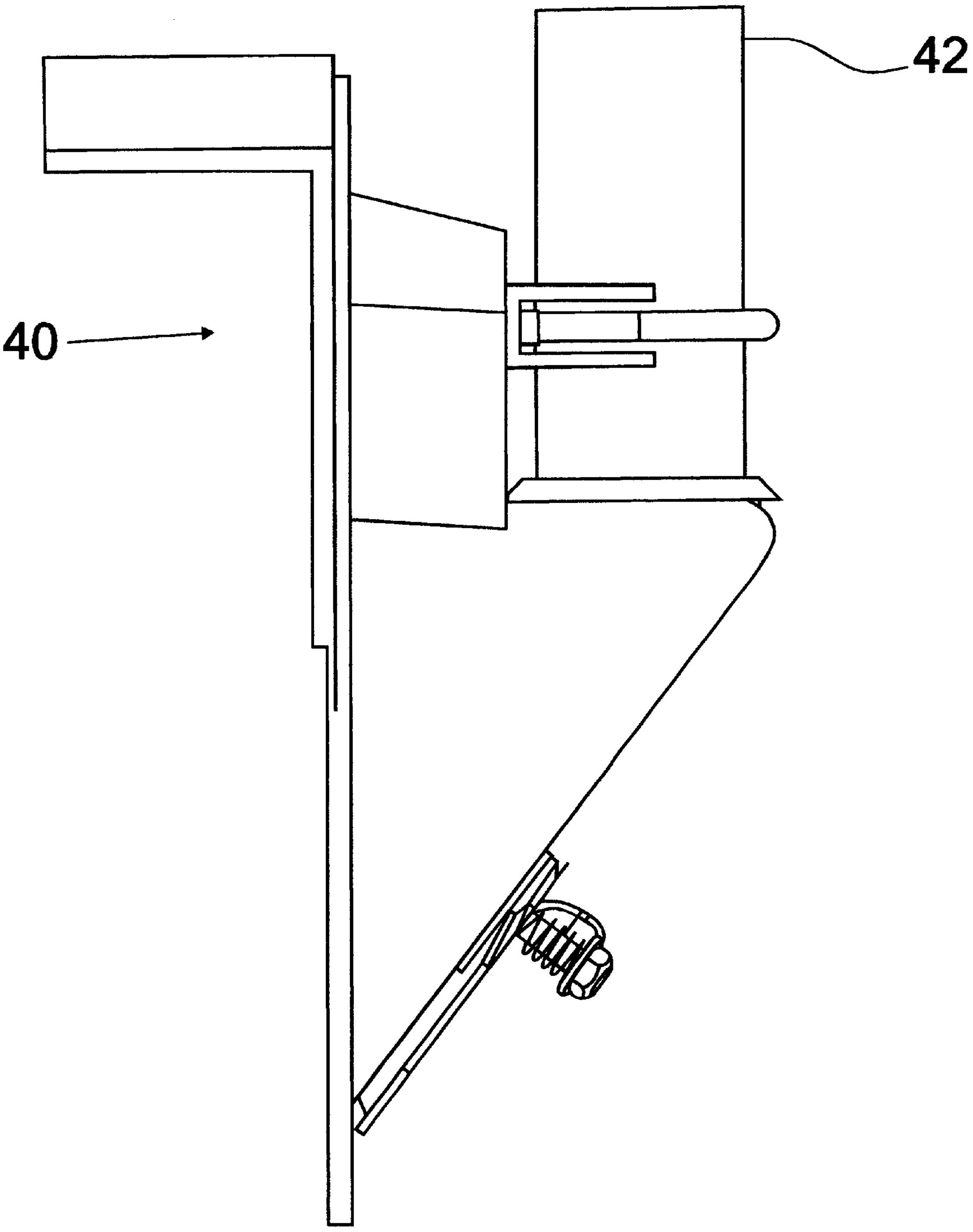
FIG. 13 is an enlarged side elevational view of the nurse system receiver assembly shown in FIG. 12.
Figure 14:
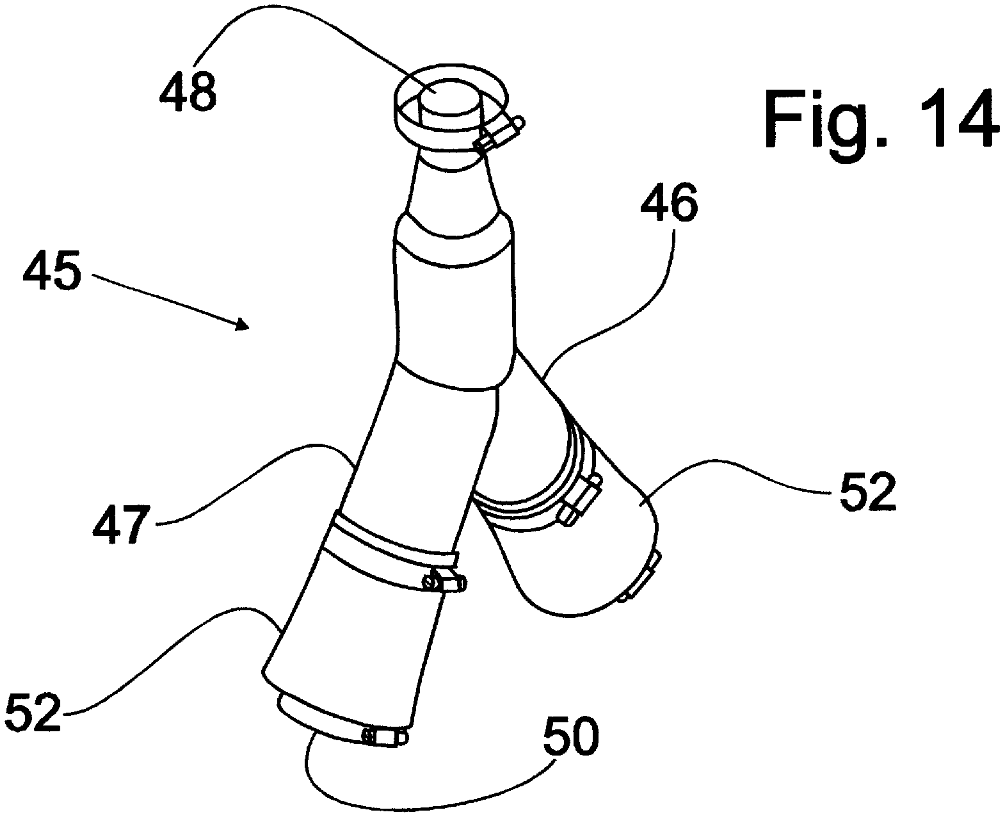
FIG. 14 is a perspective view of the nurse system receiver header assembly.
Figure 15:
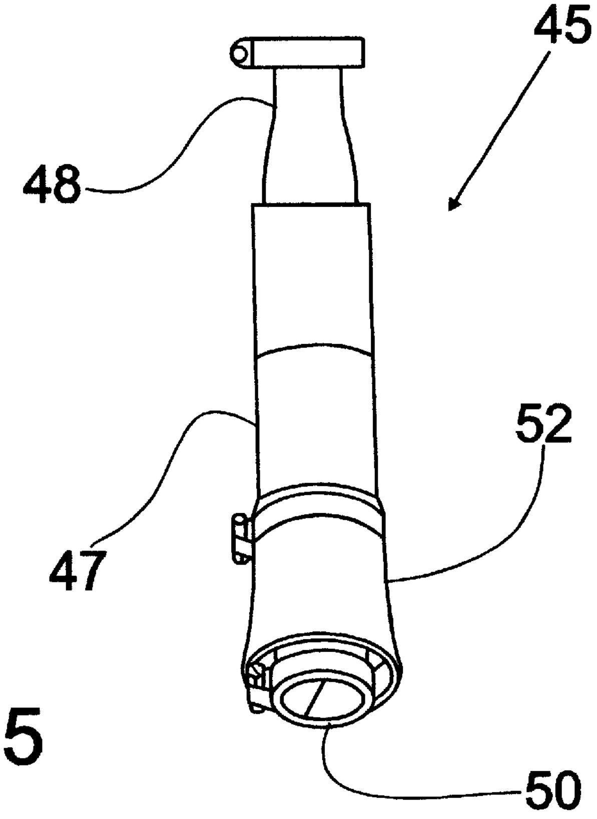
FIG. 15 is a side elevational view of the nurse system receiver header assembly shown in FIG. 14.
Figure 16:
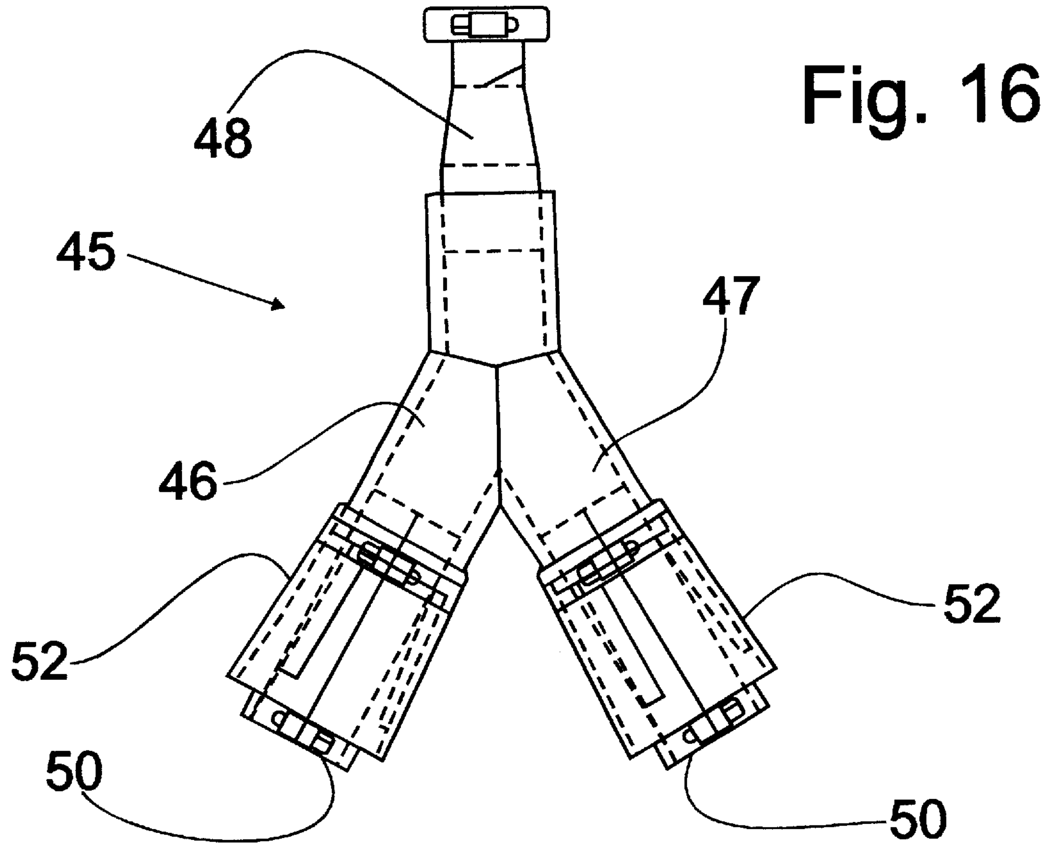
FIG. 16 is a front elevational view of the nurse system receiver header assembly shown in FIG. 14.
Figure 17:
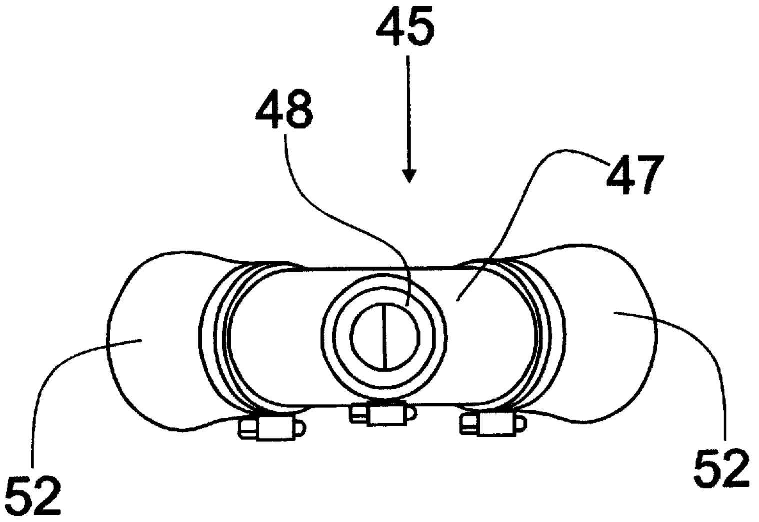
FIG. 17 is a top plan view of the nurse system receiver header assembly shown in FIG. 14.
Figure 18C:
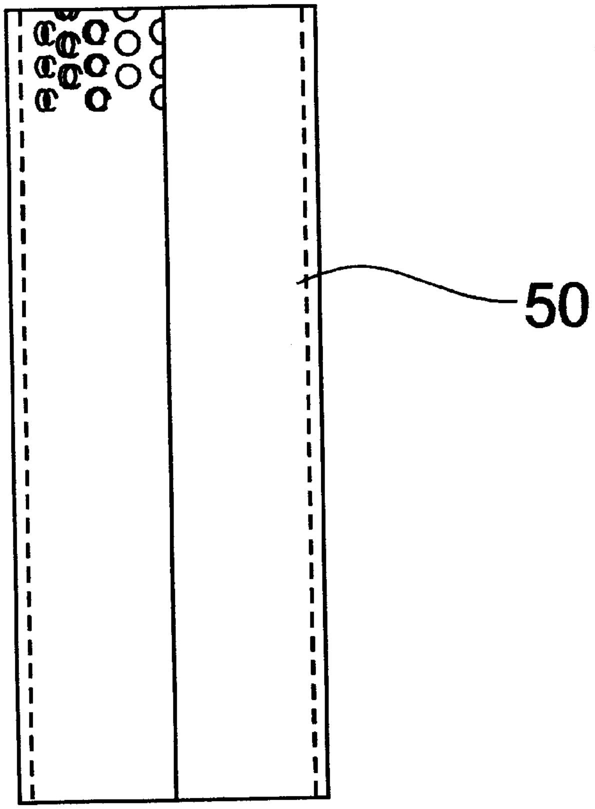
Figure 18D:
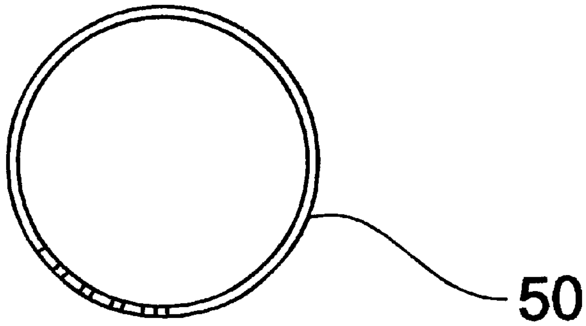

The receiver 40, as shown in FIGS. 11–13, provides a small mass of seeds in the location of the singulator pickup area 41. The seeds S are massed in the receiver 40 and in the line 42 from the receiver 40 up to the receiver header 45, which is the start of the leg 46 in the header Y. When the seeds are accumulated up to the top of the leg 46, they block the flow of air through the air vent 50 near the header bottom. When the air does not flow freely through the air vent 50, the flow of particles from the nurse inductor unit diminishes as described above. Only the small flow of air that can escape through the particles and vent 50 will continue to flow. This airflow is too low to entrain or pick-up particles.

Figure 8:
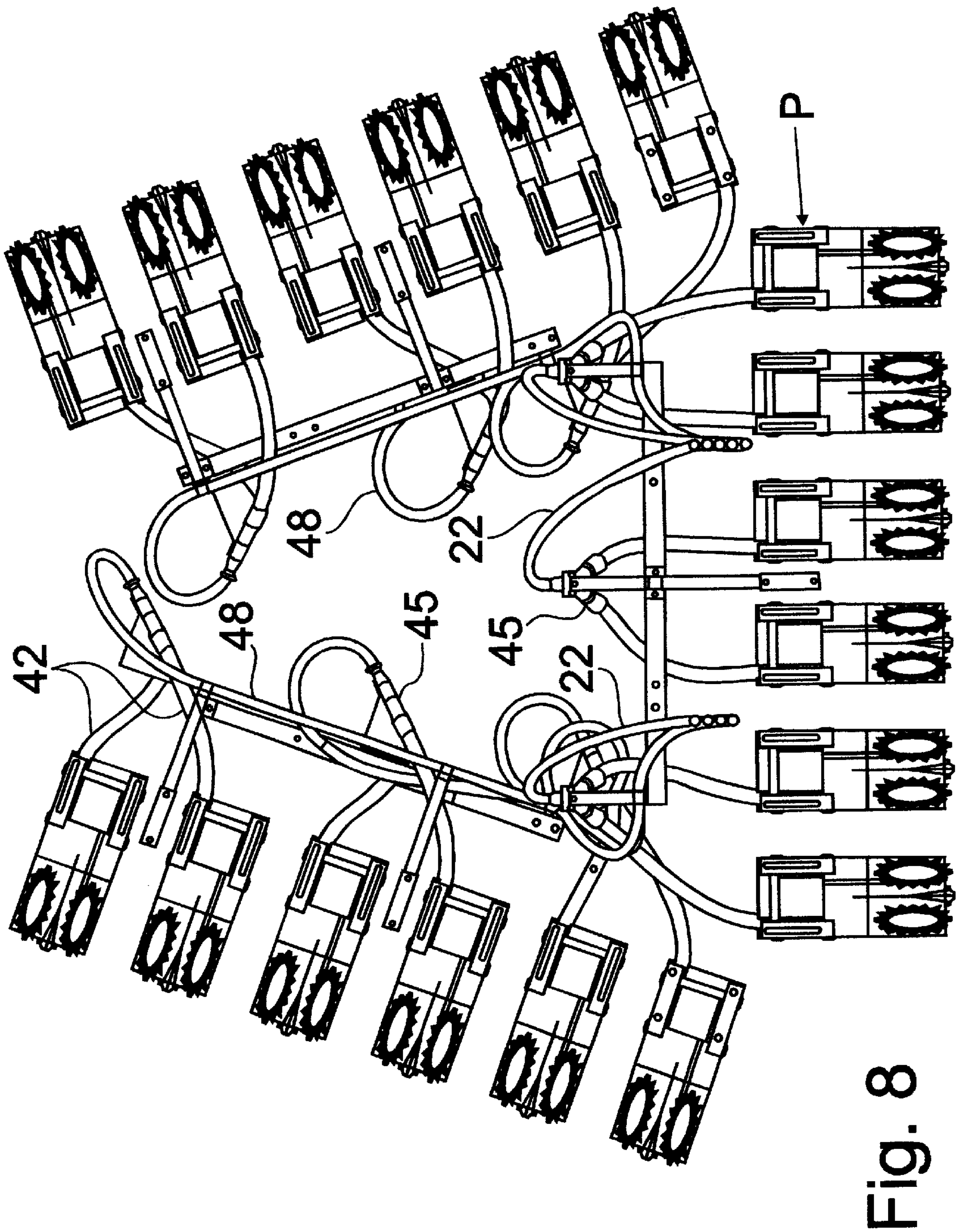
FIG. 8 is a front elevational view of a typical planting mechanism adapted for operative association with the nurse system depicted in FIG. 1 and incorporating the principles of the instant receiver header invention, the side wings of the planting mechanism being folded upwardly relative to the central section to place the planting mechanism in a transport position.
Figure 9:
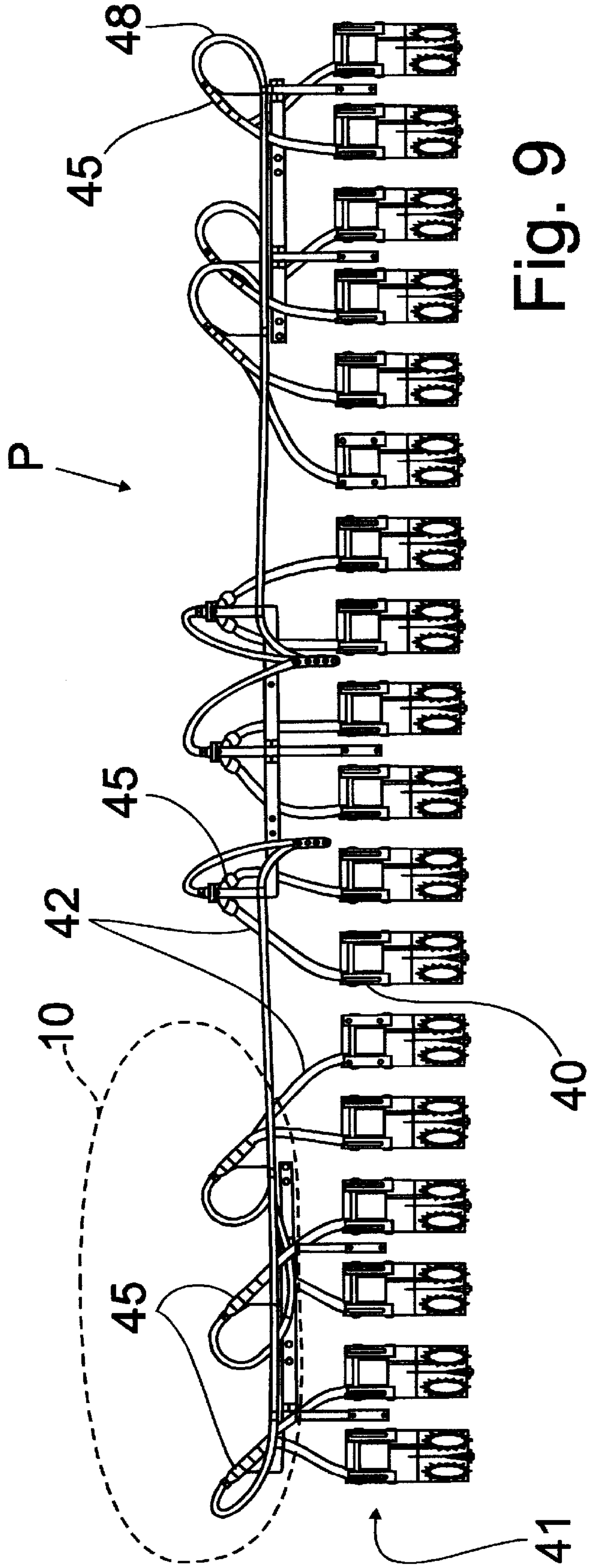
FIG. 9 is a front elevational view of the planting mechanism depicted in FIG. 8 except with the side wing sections being folded down into an operative position.
Figure 10:
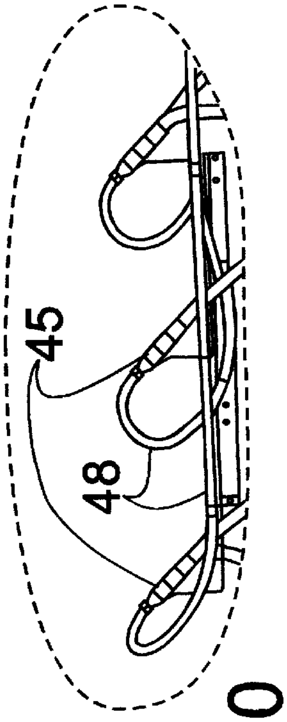
FIG. 10 is an enlarged elevational view of the nurse system receiver apparatus corresponding to the circled mechanism within FIG. 9.

If only one leg 46 of the Y is full, particles will continue to be nursed into the empty leg 47 until the air vent 50 is covered in the second leg 47 also. Then, the airflow to the header 45 will drop off and particles will not be sent in the nurse line 22 until such a time that one of the receivers 40 is emptied below the level where its air vent 50 is free. The nurse line 22 leading to the receiver header 45 is smaller than the lines 42 between the header 45 and the receiver 40 to reduce the velocity of the air flow at the receiver header 45, thus allowing the entrained seed particle to drop out of the air stream and fall be gravity to the receiver 40. To stop blocking of particles in the nurse line 22, the receiver header 45 is mounted such that the inlet line 48 is always vertically above the 10 outlet lines 42, regardless of the implement position. As best seen in FIGS. 8–10, the header 45 is mounted such that it sits at an angle inclined to the vertical in operating position. The mounting of the header 45 also permits the header 45 to be moved through vertical to an opposite angle to the vertical in the transport position, which typically involves the rotation of the header through an angle in the range of 70 to 110 degrees, or approximately 90 degrees. The header 45 never inverts to allow particles to flow out of it back down the nurse line 22 which would cause plugging. The header mount design enables folding of the planter P into transport with full receivers 40. The header 45 never inverts, so the seed particles S stay in the receivers 40 when the planter P is moved between transport and operative positions.

The vent hood 52 makes a roof over the vent 50 to allow the air to be vented out and guard against rain and contaminants getting in. The orientation of the receiver header 45 always keeps the hood 52 opening facing down, even when the toolbar is rotated into transport. Other embodiments may use receiver headers 45 that are single or triple, or other variations. It is also possible that the vent and rain guard may be incorporated directly into the receiver design if a separate header is not desirable. The single design would be mounted at an angle to provide a similar function to trap seed particles when moving into and out of transport. The single design would also preferably incorporate the vent and rain hood in a manner similar to the double configuration described above. Since the single configuration would feed only a single receiver, it would be desirable to mount the header directly onto the receiver or to incorporate the header into the receiver design. The triple configuration would be similar to the double configuration described above with the addition of one single leg.

The nurse inductor 20 enables the use of a standard air cart 10 for both the central hopper and the nurse system air source. The air cart fan can be used for both fertilizing and nursing operations simultaneously. The inductor 20 can be designed in an adapter arrangement, which enables the air cart 10 to be readily converted from a roller type metering system to the nurse inductor system, and vice versa. The change to the cart to enable nurse induction is not permanent and does not require the use of time-consuming threaded fasteners.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an agricultural seeding implement having a frame adapted for movement over the ground; a hopper supported on said frame for carrying a supply of seed, said hopper having a lower portion including a discharge opening through which seed particles pass to exit said hopper; a mechanism supported on said frame for creating a flow of air through a conduit; and a remote planting mechanism engageable with the ground for the planting of seeds therein, the improvement comprising:

- a nurse mechanism supported on said hopper to communicate with said discharge opening and said conduit to receive seeds from said hopper and intercept the flow of air coming from said mechanism for creating an air stream through said nurse mechanism, said nurse mechanism entraining seeds within said air stream for conveyance through a discharge tube in flow communication with said nurse mechanism;
- a receiver at said planting mechanism in flow communication with said discharge tube to receive seeds entrained in said air stream, said receiver accumulating a supply of seeds for utilization by said planting mechanism;
- a receiver header operatively coupled with said discharge tube and with said receiver to direct seeds entrained in said air stream toward said receiver; and
- a vent for the dissipation of said air stream, said vent being located so that said seed can fall by gravity into said receiver, said vent being operatively coupled to said receiver so that when said supply of seeds in said receiver covers said vent, seeds are no longer conveyed to said receiver by said nurse mechanism.

2. The seeding implement of claim 1 wherein said nurse mechanism is configured such that said air stream is required to have a predetermined velocity in order to entrain said seeds therein, the operative coupling of said vent to said receiver allowing the flow of air to be slowed below said predetermined velocity when said supply of seeds covers said vent causing said nurse mechanism to cease the conveyance of seeds toward said planter mechanism.

3. The seeding implement of claim 2 wherein said discharge tube has a smaller cross-sectional configuration than said receiver header so that the velocity of said air stream decreases when entering said receiver header.

4. The seeding implement of claim 3 wherein said vent further includes a hood covering said vent to minimize the entrance of contaminants into said vent.

5. The seeding implement of claim 4 wherein said hood is arranged such that said vent is covered by said hood irrespective of the position in which said receiver header is oriented.

6. The seeding implement of claim 5 wherein said vent and said hood are formed as part of said receiver header.

7. The seeding implement of claim 5 wherein said vent and said hood are formed as part of said receiver.

8. The seeding implement of claim 2 wherein said flow path receiver header is formed with multiple outlets for connection thereof to a corresponding number of said planter mechanisms, said vent being located in each said outlet adjacent to said receiver header.

9. The seeding implement of claim 8 wherein the volume of said air is maintainable through said receiver header unless all of said outlets are filled over the vent.

10. The seeding implement of claim 9 wherein said receiver at said planter mechanism contains a supply of seeds for a singulator in said planting mechanism.

11. The seeding implement of claim 2 wherein said receiver header is mounted at an angle inclined to the vertical in an operating position such that said receiver header can be rotated through an angle in the range of 70–110 degrees to a transport position without inverting said receiver header, thereby retaining said seeds between said supply of seeds between said receiver and said receiver header.

12. The seeding implement of claim 11 wherein said vent is formed in said receiver header, said receiver header further including a hood covering said vent to minimize the entrance of contaminants into said vent.

13. The seeding implement of claim 12 wherein said hood is arranged such that said vent is covered by said hood irrespective of the position in which said receiver header is oriented.

14. In an agricultural implement for planting seeds into the ground and having a hopper for transporting a first supply of seeds, an air flow mechanism for creating a flow of air through a conduit to engage said first supply of seeds to entrain said seeds into a stream of air; and a planting mechanism to receive said flow of air and entrained seeds, the improvement comprising:

a receiver header in flow communication with said air flow mechanism and a secondary reservoir, said receiver header being operable to direct the flow of seeds entrained in said air flow to at least two secondary reservoirs;

a vent operatively coupled to each said reservoir and being operable to dissipate the air from said air stream and allow the entrained seeds to move into said secondary reservoir, said vent being located relative to said receiver header and the corresponding reservoir so that when said supply of seeds in said reservoir covers said vent, seeds are no longer conveyed to said reservoir; and said planting mechanism having a singulator for controlling the spacing of seeds being planted into the ground, the reservoir operatively coupled with said singulator providing a second supply of seeds for engagement by said singulator.

15. The agricultural implement of claim 14 wherein said vent is formed in said receiver header for the dissipation of said air stream, said vent being located so that said seed can fall by gravity into said receiver.

16. The agricultural implement of claim 14 wherein said nurse mechanism is configured such that said air stream is required to have a predetermined velocity in order to entrain said seeds therein, the operative coupling of said vent to said receiver allowing the flow of air to be slowed below said predetermined velocity when said supply of seeds covers said vent causing said nurse mechanism to cease the conveyance of seeds toward said planter mechanism.

17. The agricultural implement of claim 16 wherein said flow path receiver header is formed with multiple outlets for connection thereof to a corresponding number of said planter mechanisms, said vent being located in each said outlet adjacent to said receiver header.

18. The agricultural implement of claim 17 wherein the volume of said air is maintainable through said receiver header unless all of said outlets were filled to the corresponding said vent.

19. The agricultural implement of claim 18 wherein said receiver header is mounted at an angle inclined to the vertical in an operating position such that said receiver header can be rotated through an angle in the range of approximately 90 degrees to a transport position without inverting said receiver header, thereby retaining said seeds between said supply of seeds between said receiver and said receiver header.

20. The agricultural implement of claim 19 wherein said receiver header further includes a hood covering said vent to minimize the entrance of contaminants into said vent.

21. The agricultural implement of claim 20 wherein said hood is arranged such that said vent is covered by said hood irrespective of the position in which said receiver header is oriented.

22. A seeding implement comprising:

a mobile frame adapted for movement over the ground;

a mechanism mounted on said mobile frame for creating and channeling a stream of air through a conduit;

a hopper supported on said mobile frame for carrying a supply of seed particles, said hopper having a discharge opening for the passage of said seed particles;

a planting mechanism for planting seeds into the ground, said planting mechanism having a singulator for spacing the planting of said seeds into the ground;

a nurse mechanism operatively engaged with said hopper to communicate with said discharge opening and said conduit to receive seeds from said hopper and intercept the flow of air coming from said mechanism for creating an air stream through said nurse mechanism, said nurse mechanism entraining seeds within said air stream for conveyance through a discharge tube in flow communication with said nurse mechanism;

a receiver operatively coupled to said singulator at said planting mechanism in flow communication with said discharge tube to receive seeds conveyed from said nurse mechanism through said discharge tube, said receiver accumulating a supply of seeds for utilization by said singulator; and a receiver header operatively coupled with said discharge tube and with said receiver to direct seeds entrained in said air stream toward said receiver, said receiver header having a vent therein for the dissipation of said air stream, said vent being located so that said seed can fall into said receiver after the air is dissipated from said air stream, the filling of said receiver with a supply of seeds sufficient to cover said vent halting the flow of air and entrained seeds to said reservoir.

23. The seeding implement of claim 22 wherein said nurse mechanism is configured such that said air stream is required to have a predetermined velocity in order to entrain said seeds therein, the operative coupling of said vent to said receiver allowing the flow of air to be slowed below said predetermined velocity when said supply of seeds covers said vent causing said nurse mechanism to cease the conveyance of seeds toward said planter mechanism.

24. The seeding implement of claim 23 wherein said flow path receiver header is formed with multiple outlets for connection thereof to a corresponding number of said planter mechanisms, each said outlet having one of said vents therein for utilization with the corresponding said planter mechanism, said air velocity being maintainable through said receiver header unless all of said outlets were filled to the vent.

25. The seeding implement of claim 24 wherein said receiver header further includes a hood covering each said vent to minimize the entrance of contaminants into the corresponding said vent.

26. The seeding implement of claim 25 wherein said receiver header is mounted at an angle inclined to the vertical in an operating position such that said receiver header can be rotated through an angle in the range of 70 to 110 degrees to a transport position without inverting said receiver header, thereby retaining said seeds between said supply of seeds between said receiver and said receiver header.

27. The seeding implement of claim 26 wherein each said hood is arranged such that the corresponding said vent is covered by said hood irrespective of whether said receiver header is oriented in said operating position or in said transport position.

28. The seeding implement of claim 27 wherein said discharge tube has a smaller cross-sectional configuration than said receiver header so that the velocity of said air stream decreases when entering said receiver header.

29. An agricultural implement for planting seeds into the ground comprising:

a hopper for transporting a first supply of seeds;

an air flow mechanism for creating a flow of air through a conduit to engage said first supply of seeds to entrain said seeds into a stream of air;

a planting mechanism to receive said flow of air and entrained seeds, said planting mechanism having a singulator for controlling the spacing of seeds being planted into the ground;

a reservoir operatively coupled with said singulator to provide a second supply of seeds for engagement by said singulator, said air flow mechanism directing said flow of air and entrained seeds to said reservoir; and a vent for the dissipation of said air stream, said vent being located so that said seed can fall by gravity into said receiver, the filling of said receiver with sufficient seeds to cover said vent effecting a halting of the flow of air and entrained seeds to said reservoir.

30. The agricultural implement of claim 29 further comprising:

a hood covering said vent to minimize the entrance of contaminants into said vent.

31. The seeding implement of claim 31 wherein said vent and said hood are formed as part of said receiver.

32. The seeding implement of claim 30 further comprising:

a receiver header in flow communication with said air flow mechanism and with said reservoir to direct seeds entrained in said air stream toward said receiver, said receiver header being operatively connected with a plurality of receivers.

33. The seeding implement of claim 32 wherein said vent and said hood are formed as part of said receiver header.

34. The seeding implement of claim 32 wherein said hood is arranged such that said vent is covered by said hood irrespective of the position in which said receiver header is oriented.

35. An agricultural implement for planting seeds into the ground comprising:

a hopper for transporting a first supply of seeds;

an air flow mechanism for creating a flow of air through a conduit to engage said first supply of seeds to entrain said seeds into a stream of air;

a planting mechanism to receive said flow of air and entrained seeds, said planting mechanism having a singulator for controlling the spacing of seeds being planted into the ground;

a reservoir operatively coupled with said singulator to provide a second supply of seeds for engagement by said singulator, said air flow mechanism directing said flow of air and entrained seeds to said reservoir;

a vent for the dissipation of said air stream, said vent being located so that said seed can fall by gravity into said receiver; and a hood covering said vent to minimize the entrance of contaminants into said vent.

36. The seeding implement of claim 35 wherein said vent and said hood are formed as part of said receiver header.

37. The seeding implement of claim 36 wherein said hood is arranged such that said vent is covered by said hood irrespective of the position in which said receiver header is oriented.

* * * * *